United States Patent [19]
Jensen

[11] Patent Number: 5,651,212
[45] Date of Patent: Jul. 29, 1997

[54] STRIPPING THORNS FROM ROSE STEMS

[76] Inventor: Ann F. Jensen, 48 Park Ter., West Orange, N.J. 07052

[21] Appl. No.: 676,088

[22] Filed: Jul. 2, 1996

[51] Int. Cl.⁶ ............................................. A01G 1/04
[52] U.S. Cl. ............................................. 47/1.01
[58] Field of Search ........................ 47/1 B, 1.01, 1.7

[56] References Cited

U.S. PATENT DOCUMENTS

| | | | |
|---|---|---|---|
| 887,519 | 5/1908 | Reed | 47/1 B |
| 2,167,337 | 7/1939 | DeMeester | 47/1 B |
| 2,592,833 | 4/1952 | Swanson | 47/1 B |
| 2,611,215 | 9/1952 | Johnson | 47/1 B |
| 2,848,841 | 8/1958 | Kuts | 47/1 B |
| 5,062,238 | 11/1991 | Smith et al. | 47/1 B |

FOREIGN PATENT DOCUMENTS

| | | | |
|---|---|---|---|
| 0383410 | 8/1990 | European Pat. Off. | 47/1 B |
| 2408296 | 7/1979 | France | 47/1 B |
| 6276811 | 10/1994 | Japan | 47/1 B |
| 1012840 | 4/1983 | U.S.S.R. | 47/1 B |
| 1655365 | 6/1991 | U.S.S.R. | 47/1 B |

OTHER PUBLICATIONS

Rose Cleaning Machine, Kayesco Inc., (date unknown).
Strip/Scrubber, (date unknown).

*Primary Examiner*—Terry Lee Melius
*Assistant Examiner*—Joanne C. Downs
*Attorney, Agent, or Firm*—Cobrin Gittes & Samuel

[57] ABSTRACT

Thorns from plant stems are stripped off by feeding the plant stem between splines. The splines project radially from respective rotary components arranged side by side. The rotary components rotate towards each other as viewed from the opening in the topside of the housing and away from each other as viewed from the opening in the bottomside of the housing. The plant stem having thorns is fed through the topside opening in the housing in a direction toward the bottomside opening to reach a location between said rotary components so that said brush splines swipe against said thorns thereby removing the same from the stem.

4 Claims, 2 Drawing Sheets

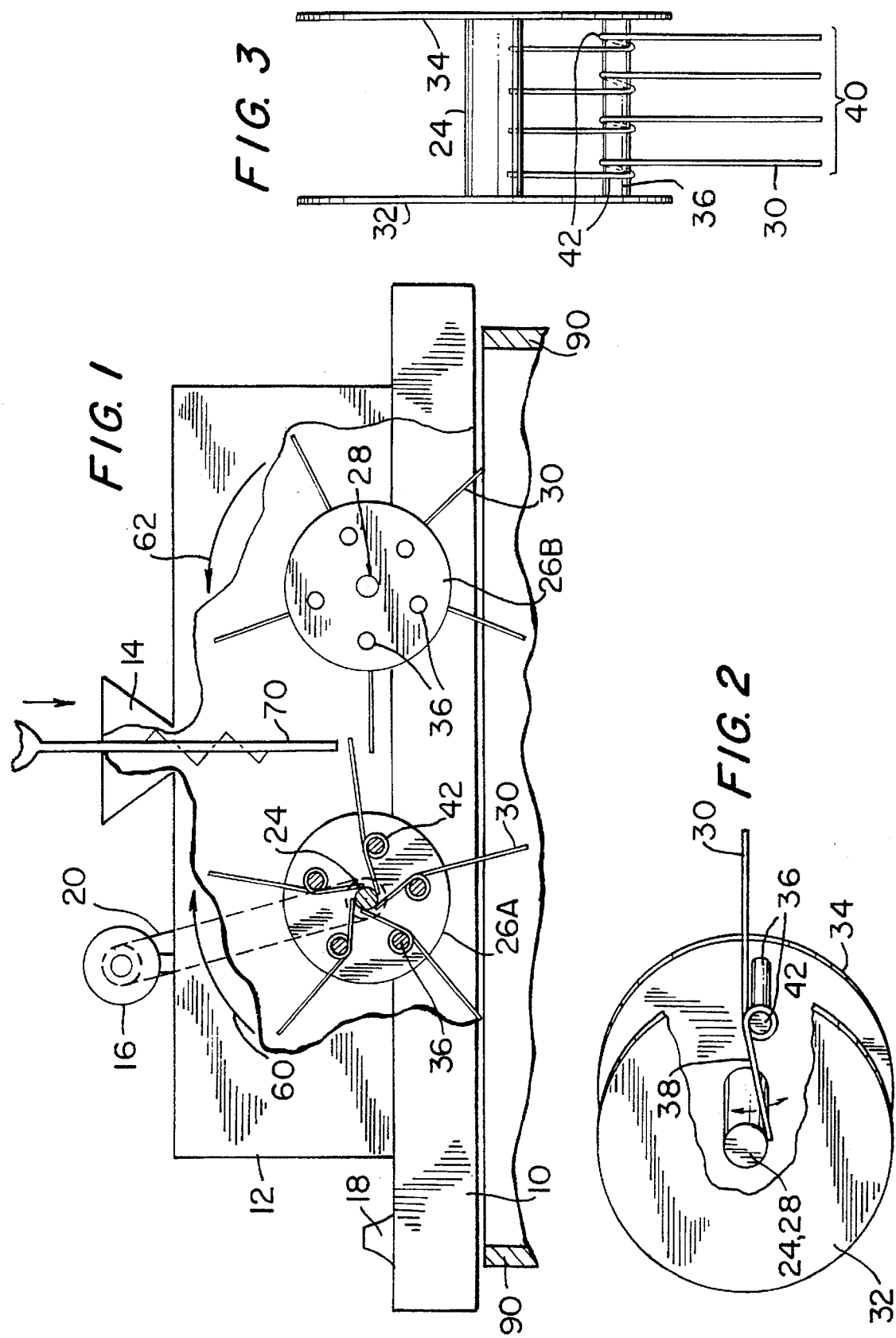

STRIPPING THORNS FROM ROSE STEMS

BACKGROUND OF THE INVENTION

1. Field of the Invention

The present invention relates to an apparatus and a method of stripping thorns from rose stems without damaging the stems.

2. Description of Related Art

Handheld metal grippers are used to strip thorns from rose stems. The grippers are placed on the stem just beneath the flowering bulb and then pulled downwardly along the stem. The grippers strip off the thorns in the process. Since rose stems are not of uniform diameter, portions of the outer surface of the stem itself are typically stripped off along with the thorns by the handheld metal grippers. The stem then becomes susceptible to disease through the break in its outer surface.

Various plant stem cleaning devices are available conventionally for stripping thorns from rose stems. These devices have exposed rotary components with rotating brushes on a common axle that effect the cleaning. The person using the devices generally must hold the rose stem in position as the rotary components turn so that the brushes may strip the rose stems of thorns. It has been the experience of some that these devices generally blunt the thorns but do not completely remove them. Also, proper positioning of the rose stem requires some dexterity on the part of the user and tends to slow down the cleaning process.

While conventional devices are mounted over a trash can to receive the stripped plant material, large shields are required about the device and above the trash can to block the stripped material from falling onto the floor or elsewhere away from the trash can. The shields must be large to permit access for proper positioning of the rose stems during the stripping process.

SUMMARY OF THE INVENTION

One aspect of the invention resides in a device the strips thorns from rose stems by directing the stripped plant material in a downward direction only between two rotary components that rotate in opposite directions and have splines that protrude radially outward. The rotary components are housed within a housing that has a topside opening and a bottomside opening. The openings are aligned.

The rotation of the rotary components is such that they rotate towards each other as viewed from the opening in the topside of the housing and away from each other as viewed from the opening in the bottomside of the housing. This arrangement ensures that the stripped plant material falls into an underlying waste receptacle.

BRIEF DESCRIPTION OF THE DRAWING

For a better understanding of the present invention, reference is made to the following description and accompanying drawings, while the scope of the invention is set forth in the appended claims.

FIG. 1 shows a schematic representation of an elevational view of a rose stem stripper and base in accordance with the invention. The base rests atop a waste receptacle FIG. 2 shows a perspective view of a wheel of FIG. 1.

FIG. 3 shows a top view of the wheel of FIG. 2.

DESCRIPTION OF THE PREFERRED EMBODIMENT

Figure 4:
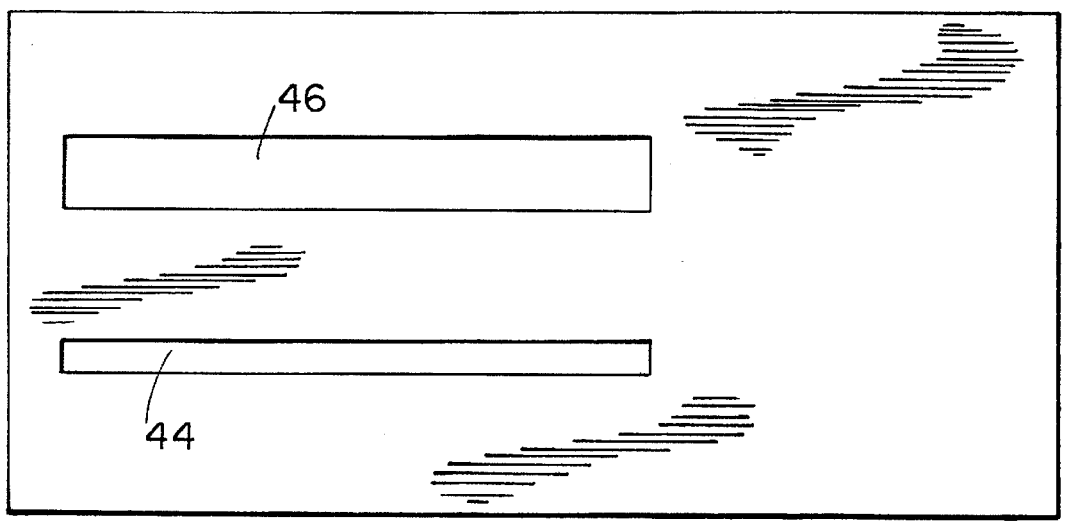
FIG. 4 shows a bottom view of the base of FIG. 1.

FIG. 1 shows a base 10, a stripper mechanism housing 12, a feed funnel 14, a motor 16 and a handle 18. The motor 16 drives a belt 20 in a conventional manner. The belt turns a pulley wheel 22 (FIG. 5) on a drive shaft 24 that is rotatable therewith.

FIG. 1 also shows a pair of rotary components or wheels 26A, 26B. Wheel 26A turns together with drive shaft 24 and wheel 26B turns together with drive shaft 28. Each wheel has spaced apart bristles or splines 30 that project radially outward beyond the periphery of the wheel from which they project.

Turning to FIG. 2, wheels 26A, 26B are represented schematically. Each has two circular discs 32, 34 spaced apart from each other by a series of posts 36, such as five equidistantly spaced apart in a circumferential manner about the shaft axis. The splines of wheel 26A have an end resting at the drive shaft 24, 28 and looped around a respective one of the posts 36 to project outward beyond the periphery of the wheel 26A and yet extend in a generally radial direction away from the shaft axis. Since the end of the spline rests on the drive shaft, there is some play in the direction of the arrows 38 for each of the individual splines.

Turning to FIG. 3, a set 40 of splines are shown looped around and projecting outward from a common post 36 and extending inward to rest on the drive shaft 24, 28. The loops 42 are spaced apart from each other.

While FIGS. 2 and 3 only show a single spline or set of splines looped around one post, such an arrangement is duplicated at each of the posts on both wheels.

FIG. 4 shows the view from the underside of the base 10, revealing openings 44, 46. The larger opening 46 is in alignment with the opening in the funnel 14. The wheels 26A, 26B are accessible via the opening 46.

Figure 5:
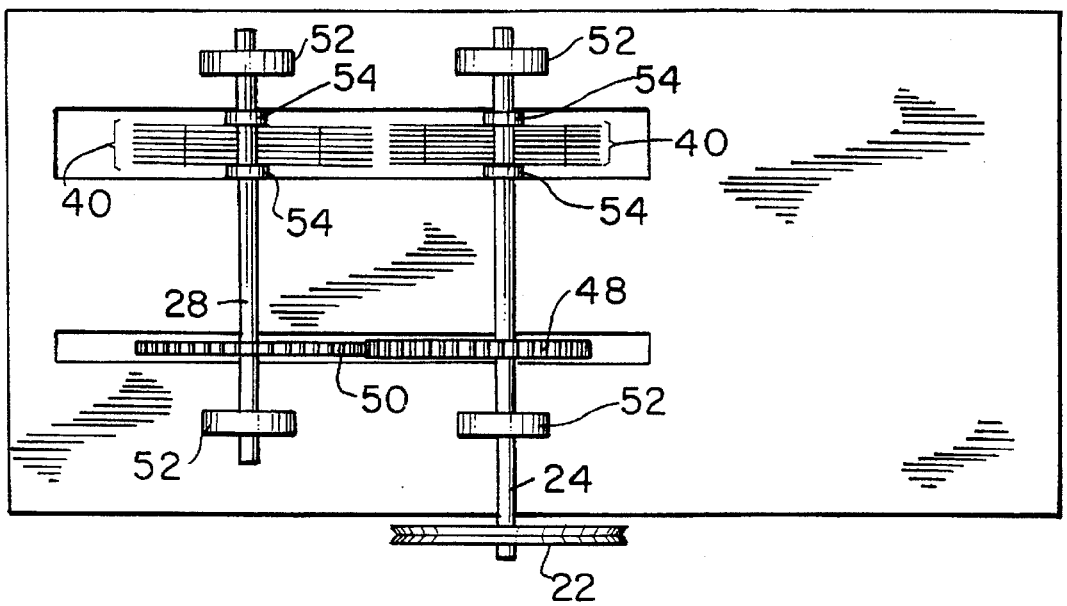
FIG. 5 is a top view of the stripper of FIG. 1 except with the top surface removed to all viewing of the interior.

FIG. 5 shows the transmission for driving the wheels. The transmission includes the drive shafts 24, 28 that extend substantially parallel to each other so that their drive axes are substantially parallel. Each shaft has a pair of spacers 54 between which is held an associated one of the wheels 26A, 26B. The gears are accessible through the opening The transmission also includes meshing gears 48, 50 that, in response to the driving of the drive shaft 24 to rotate in a clockwise direction, causes the drive shaft 28 to rotate in a counterclockwise direction. In this manner, the drive shafts 24, 28 rotate in opposite directions. Bearings 52 are provided to permit the drive shafts to freely rotate in a conventional manner.

The belt 20 is driven by the motor 16 that has a sufficient horsepower to rotate the drive shafts 24, 28 through the transmission within the same range of speed as attained by motors of typical consumer appliances such as a sewing machine motor.

As a result of rotation in the direction of arrows 60, 62 shown in FIG. 1, the splines from one wheel 26A mesh with neighboring splines of the other brush wheel 26B as they rotate between the wheels. The splines may be resilient in allowing the rose stem 70 to fit between the wheels during rotation of the wheels while the splines press against the rose stem.

The splines of one wheel may be offset from those of the other wheel to enable meshing, but preferably the splines of each swipe the thorns to remove them and exert forces on the stem from opposite sides so that their forces simultaneously oppose each other and help keep the stem from flexing in one direction or the other. The splines of one wheel may be offset both circumferentially and axially relative to the splines of the other wheel.

The base 10 of FIG. 1 sits atop a trash or waste receptacle 90. As a consequence, thorns, leaves or other extraneous plant matter aside from the stem are cleaved or cut off from the stem and fall by gravity into the receptacle 90. As viewed from the opening 46 at the underside of the base, the wheels appear to rotate away from each other so that the splines that mesh force the thorns and other plant matter in a generally downward direction into the receptacle.

For the sake of brevity, some component views are not shown. All exterior surfaces of the stripper mechanism housing and base are substantially flat; the housing is box-like in appearance with its opposite ends mirroring each other and its elongated sides mirroring each other. FIGS. 1 and 4 show a sufficient number of surfaces of the base to be representative of all because the sides not shown mirror their opposing counterparts that are shown. The base is generally rectangular with through going openings. The housing has an open bottom secured to the topside of the base. The housing may be less wide than the base in addition to being shorter in length as shown in FIG. 1.

Aside from the openings in the underside of the base and the funnel opening at the topside of the housing, the meshing gears and wheels with splines are completely enclosed by the housing. This arrangement is much safer to operate than conventional stripping devices that left the brushes for removing thorns fully exposed.

The handle 18 extends in a widthwise direction of the base and is raised to define an elongated space between the topside of the base and the widthwise inner facing side of the handle to allow one's hand to enter for grasping.

The configuration of the housing and base may be any shape and may be a unitary construction. The primary function is to be sufficiently sturdy to allow the transmission to operate under the power of the motor and to rest across a waste receptacle to allow the thorns from the plant stem to fall into it through the openings in the underside of the base. Another function is to fully enclose the cutting area so as to avoid the need for arranging additional shields to block cut plant debris from going anywhere other than into the receptacle.

In addition, the typical use calls for inserting the stem through the funnel and into the area between the rotating wheels to allow the splines to do their thorn removing function. After being fully inserted, but with the flowering portion remaining above the funnel, the stem is withdrawn by pulling it up through the funnel. During both the inserting and withdrawing steps, the stem is being stripped of its thorns.

While the foregoing description and drawings represent the preferred embodiments of the present invention, it will be understood that various changes and modifications may be made without departing from the spirit and scope of the present invention.

What is claimed is:

1. An apparatus to strip thorns from rose stems, comprising:

a housing with a topside and a bottomside each having an opening in alignment with each other;

two rotary components rotatable about respective axes and arranged spaced from each other in a side by side relationship so that said axes are parallel to each other, said two rotary components being within said housing;

drivers that drive the rotary components to rotate so that a first of said rotary components rotates in a clockwise direction about a first of said axes and a second of the rotary components rotates in a counterclockwise direction about a second of said axes and so that said rotary components rotate towards each other as viewed from the opening in the topside of the housing and away from each other as viewed from the opening in the bottomside of the housing; and two pluralities of splines that strip thorns from a plant stem as the plant stem is moved through the topside opening and between said rotary components while the rotary components are being driven to rotate by said drivers, a first of said two pluralities of splines extending from the first of said rotary components in a direction radially outward away from the first of said axes and being rotatable in unison with the first of said rotary components, a second of said two pluralities of splines extending from the second of said rotary components in a direction radially outward away from the second of said axes and being rotatable with a second of said rotary components, whereby said stripped thorns fall through the bottomside opening.

2. An apparatus as in claim 1, further comprising:

a guide converging to the opening on the topside of said housing.

3. An apparatus as in claim 1, wherein each of said pluralities of said splines include a respective set of splines, each of said splines of said set being spaced apart from each other in an axial direction of said rotary components.

4. A method to strip thorns from rose stems, comprising the steps of:

rotating two rotary components about respective axes, a first of said rotary components rotating in a clockwise direction about a first of said axes and a second of said rotary components rotating in a counterclockwise direction about a second of said axes, said rotary components being arranged spaced from each other in a side by side relationship so that said axes are substantially parallel to each other, each rotary component including a respective plurality of splines mounted thereon;

said rotary components being enclosed within a housing having a topside opening and a bottomside opening aligned with each other, said rotary components rotating towards each other as viewed from the opening in the topside of the housing and away from each other as viewed from the opening in the bottomside of the housing;

feeding a plant stem having thorns through the topside opening in the housing in a direction toward the bottomside opening to reach a location between said rotary components; and stripping the thorns from the plant stem during rotational movement of the two pluralities of splines while the plant stem is positioned between the two pluralities of the splines so that the stripped thorns fall through the bottomside opening, a first plurality of said splines extending in a direction radially outward away from said first of said axes and being rotatable in unison with the first of the rotary components, a second of said pluralities of splines extending in a direction radially outward away from said second of said axes and being rotatable in unison with the second of the rotary components.

* * * * *